Patented Oct. 26, 1937

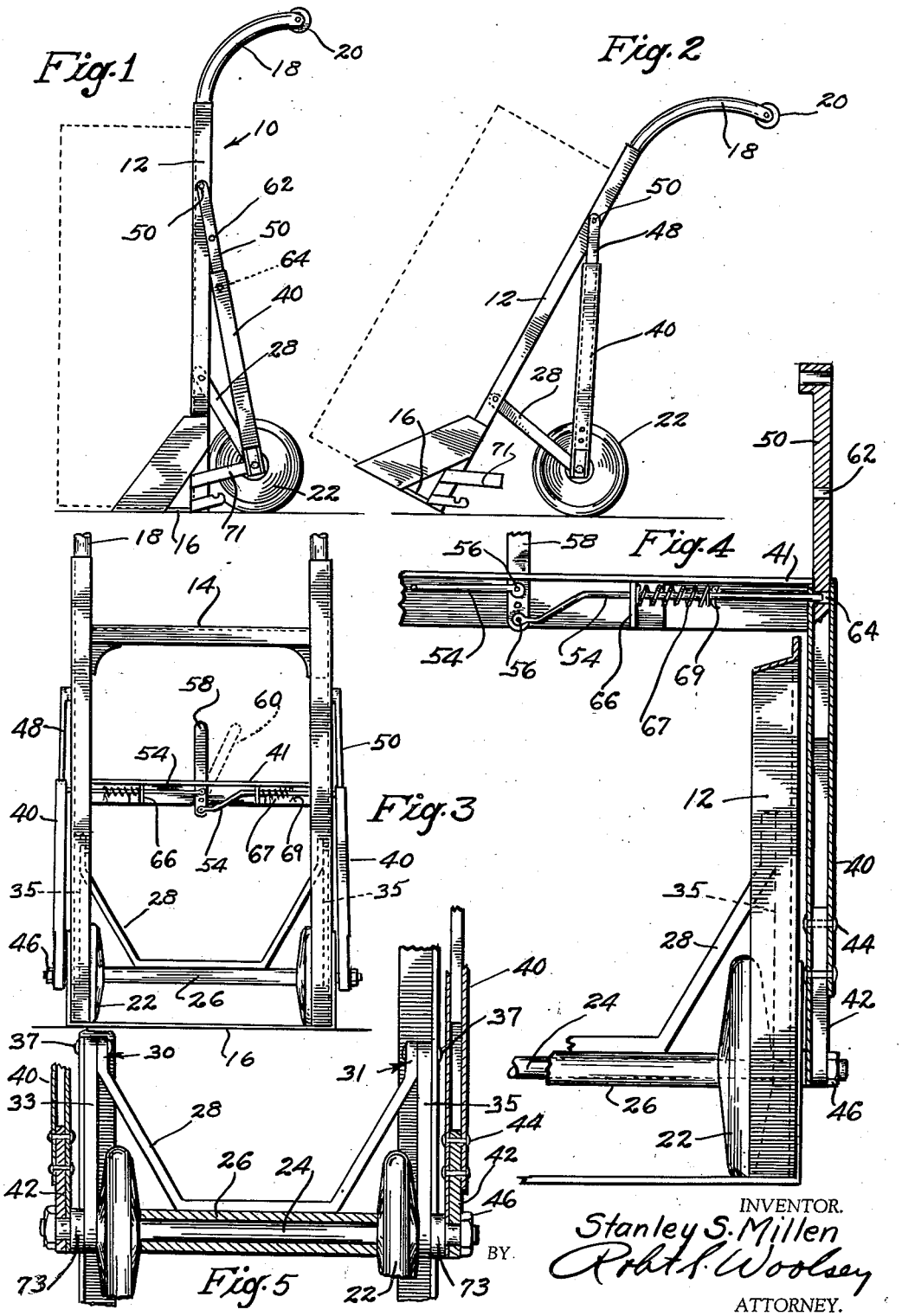

2,096,994

UNITED STATES PATENT OFFICE 2,096,994

HAND TRUCK

Stanley S. Millen, Glendale, Calif.

Application May 3, 1937, Serial No. 140,288

1 Claim. (Cl. 280—56)

The device of this invention relates to hand trucks, particular reference being had to that type of hand operated truck which is especially adapted to be used in moving such devices as stoves, refrigerators, radios, etc.

Recognition is made of the fact that certain effort has been made in developing a truck which meets the requirements in moving merchandise of the above referred to character, but insofar as applicant has knowledge, no device extant presents the uniqueness and novelty of the sole point of invention in a hand truck of the type under consideration.

In moving merchandise of the above referred to character, it is frequently necessary to be able to shift the center of gravity of the truck without impairing the facility with which the merchandise or freight can be moved from one place to another.

With the foregoing premise in mind it is accordingly a prime object of the present invention to provide simple and easily operated means to enable an operator to shift the center of gravity of a truck burdened with freight.

A further object of the invention is to provide convenient, practical, reliable, and efficient means to lock a truck, of the character contemplated, in a position to which its center of gravity has been newly shifted.

A still further object of the invention is to provide a sturdy, reliable, simple, efficient, and relatively low cost hand truck of the character contemplated.

Other objects, features and advantages of the invention may be apparent from the accompanying drawing, the specification and the appended claim.

In the drawing of which there is one sheet:

Figure 1 is a side elevation showing the truck of this invention, in folded position.

Figure 2 is a side elevation of the truck of this invention, showing the same in expanded position.

Figure 3 is a front elevation of a substantial portion of the truck of this invention showing construction in general.

Figure 4 is a fragment of the truck, showing construction in detail.

Figure 5 is a detailed fragmental view showing construction.

Reference to the drawing will show that the truck of this invention comprises a frame 10 formed with side rails 12 and reinforcing members 14 and 16, of which the member 16 serves as the toe or snout of the truck to aid in placing the truck's burden in position thereupon, as well as serving to structurally strengthen the truck. The ends of the rails 12 are provided with handles 18, in the free ends of which are mounted anti-friction rollers 20 to facilitate moving the truck if and when the same is placed in the position of and used as a four wheeled vehicle.

The frame 10 is provided with wheels 22 which are rotatably mounted upon an axle shaft 24, which is adjustably positioned with respect to the frame 10 so as to enable an operator to vary the center of gravity of the truck in order to facilitate the movement of freight.

As shown in the drawing the axle 24 is journalled in sleeve 26 which extends the length of the spacing between the wheels 22. The sleeve 26 is provided with a bracing member 28 which is substantially U shaped, and which is adapted to have its free ends 30 and 31 secured to the upper ends of swingable links 33 and 35. The links 33 and 35 are pivotally mounted upon the lower extremity of the rails 12 by any suitable means, such as rivets 37, while the lower ends of the links are journalled upon the axle 24.

Rectangular sleeves 40 are also journalled to the free ends of the axle 24 by such means as may be appropriate, as by the use of inserts 42 which may be held within the sleeves 40 by welding or rivets 44. The sleeves 40 are held in position upon the axle by nuts 46.

The sleeves 40 are joined at their upper extremity by means of an angle-iron 41 which not only strengthens the sleeves 40, but provides a mounting for a locking device to be hereinafter more particularly described.

Swingable connecters 48 are fulcrumed upon rivets 50 secured in the upper extremity of the rails 12, and are adapted to have their free end extend within the sleeve 40 in order that relative motion may be obtained there-between when it is necessary to shift the center of gravity of the truck.

It is desirable that means be provided to lock the connecters 50 with respect to the sleeves 40, this I accomplish by means of rods 54 which are suitably positioned upon pins 56, secured upon an oscillatable lever 58, so as to provide a reciprocating motion when the lever 58 is swung to the position indicated in dotted lines 60.

At all ordinary times the free ends of the rods 54 are nested within openings 62 or 64, depending upon whether the truck is in folded or extended position. In order that the rods 54 will normally remain seated within a selected opening 62 or 64, I provide angle clips 66, secured to angle-iron 41, through which the rods are adapted to slide and which forms an abutment for one end of the springs 67, the other end of the springs 67 being compressed against cotter pin 69 or other suitable abutment formed upon the rods 54, so that when the lever 58 is moved to dotted line position 60, the springs 67 will be further compressed and will be under a normal urge to force the rods 54 into one or the other of the openings 62 or 64 upon release of the lever 58.

When the truck is trundled in folded position, it is necessary that means be provided to hold the wheels 22 and associated gear, in spaced relation to the frame 12, this I accomplish by forming spurs 71 upon the lower end of the rails 12, which spurs are adapted to abut and rest upon collars 73 which are loosely positioned upon the axle 24 at a point between the links 33—35 and the rectangular sleeve 40, thus effectively holding the wheels in spaced relation to the frame 10 so that the truck may be used when in folded position, as well as when in extended position.

It is believed that it is hardly necessary to explain the method of applying the truck of this invention to use, suffice to state that the truck may be used when in folded position as shown in Figure 1, or as when in extended position as shown in Figure 2.

Depending upon the particular load of freight to be moved, the center of gravity of the truck when in trundling position, may be readily shifted by moving the lever 60 to the position shown in dotted lines, thereby releasing the rods 54 from engagement with the opening 62 or 64, or such other opening as may be established to provide variations of the extreme positions of being folded or extended as shown.

In practice and in daily operation the truck of this invention is found to be reliable, flexible and extremely convenient in moving various types of freight, such as have been previously referred to.

It is obvious that various changes and modifications and variations may be made in practicing the invention in departure from the particular showing of the drawing and description as given, without, however, departing from the true spirit of the invention as defined by the scope of the appended claim.

I claim:

In a hand truck, a frame, wheels, said wheels being adapted to normally support said truck, swingable links pivotally connected to said frame and journalled upon an axle upon which said wheels are journalled, a rectangular sleeve journalled upon said axle and extending in vertically inclined position, swingable connecters pivotally joined to said frame and adapted to be sheathed within said rectangular sleeve, and means to interlock said connecter and said sleeve, said means comprising lever retracted rods having their ends seated in said sleeves and being spring pressed to enter openings formed in said connecters upon release of said lever.

STANLEY S. MILLEN.